United States Patent [19]
Vander Mey

[11] Patent Number: 5,263,046
[45] Date of Patent: Nov. 16, 1993

[54] SPREAD-SPECTRUM CHIRP COMMUNICATION WITH SHARPLY DEFINED BANDWIDTH

[75] Inventor: James E. Vander Mey, Ocala, Fla.

[73] Assignee: Intellon Corporation, Ocala, Fla.

[21] Appl. No.: 880,545

[22] Filed: May 8, 1992

[51] Int. Cl.$^5$ ............................................. H04L 27/30
[52] U.S. Cl. ............................................. 375/1; 380/34
[58] Field of Search ............................... 375/1; 380/34

[56] References Cited

U.S. PATENT DOCUMENTS

| | | | |
|---|---|---|---|
| 3,691,464 | 9/1972 | Dayton et al. | 375/1 |
| 4,100,498 | 7/1978 | Alsup et al. | 328/14 |
| 4,244,053 | 1/1981 | Clinch et al. | 380/34 |
| 4,438,519 | 3/1984 | Bose | 375/1 |
| 4,468,792 | 8/1984 | Baker et al. | 375/1 X |
| 4,864,589 | 9/1989 | Endo | 375/1 |

Primary Examiner—Bernarr E. Gregory
Attorney, Agent, or Firm—Fish & Richardson

[57] ABSTRACT

Communication apparatus and method that includes generating a series of successive spread-spectrum chirp signals, which are progressively swept within a defined bandwidth. The chirps are divided into two frequency-swept portions, one beginning at an intermediate frequency within the bandwidth being swept to one end of the frequency range of the chirp, and a second beginning at the other end of the frequency range and being swept to the intermediate frequency. This has the effect of moving the frequency transition from the boundaries of the chirp to its center, with the result that the discontinuities introduced at the boundaries by phase reversals due to successive modulated chirps generate less out-of-band energy. In preferred embodiments, the full frequency range of the chirp is at least about two octaves (two doublings of frequency), and the intermediate frequency is at least about one octave (one doubling of frequency) from the either end of the range, whereby the one-half and double frequency components that result from phase reversals remain within the band. The method and apparatus may be used for communication over power lines.

46 Claims, 14 Drawing Sheets

SPREAD-SPECTRUM CHIRP COMMUNICATION WITH SHARPLY DEFINED BANDWIDTH

Cross Reference To Related Applications

This application is related to co-pending application entitled TIMING FOR SPREAD-SPECTRUM NETWORK COMMUNICATION, Ser. No. 07/863,213, filed Apr. 3, 1992, and herein incorporated by reference.

BACKGROUND OF THE INVENTION

This application relates to chirp spread-spectrum communication systems and in particular to chirp spread-spectrum communication systems for use on noisy network media such as power lines where signal energy must be tightly contained within a frequency band.

Spread-spectrum communication is a method whereby information is communicated using a bandwidth that greatly exceeds that required by information theory. These methods provide signals over a wide bandwidth, and with proper signal processing the communication is immune to large amounts of noise within that bandwidth. In chirp spread-spectrum methods, a signal burst known as a chirp is transmitted. Each chirp has energy spread across a frequency range. The frequency spread may be achieved by frequency sweeping or by other known techniques (such as direct sequence). Chirps may be sent asynchronously, or at synchronous intervals, including as concatenated chirps. Data modulation of the chirp stream can be accomplished by means such as phase reversal modulation of the chirps or reversal of the frequency sequence of the chirp. A transversal filter in the receiver is matched to the chirp(s) expected, enabling individual chirps to be detected even on noisy network media such as power lines.

In some applications of this communications method, it is necessary or desirable that the energy of the signal beyond the nominal signalling bandwidth be kept to a very low level. For example, conducted signal energy on the power line must be below 1000 uV in the frequency range of 535 Khz to 1710 Khz to meet FCC part 15 requirements for carrier current systems. If a wideband chirp signal of substantial energy is desired, say from 100 Khz to 400 Khz, the out-of-band energy must diminish very rapidly to meet these requirements. The alternative is to limit the transmitted signal strength, which inhibits performance. Conventional spread spectrum signalling techniques cannot normally accomplish this without the addition of costly filtering.

Another example where tightly contained signal energy is important is when adjacent wideband signalling bands are to be used. For example, it may be desirable to have a wideband chirp signal having a frequency span of 20 Khz to 80 Khz used on the same power line as a 100 Khz to 400 Khz wideband chirp signal. The simultaneous use of adjacent bands is feasible if the out-of-band energy of each is highly constrained so as not to limit the dynamic range of the other. The same chirp signal format can be used for both bands by simply slowing the 100 Khz to 400 Khz chirp signal generation source by a factor of five. In this instance, each of the signals has the same information theory processing gain, but the lower band (20 Khz to 80 Khz) has a signal power density five times that of the higher band (100 Khz to 400 Khz) and a data rate that is one fifth the higher band.

In both examples given, it is more important that the high frequency portion of the band be the most tightly constrained. In the first case, the FCC part 15 limits are effective at the higher end of the 100 Khz to 400 Khz band, and in the second case, the signal energy is five times greater in the lower band than in the adjacent upper band, allowing the higher band to have more of its lower end signal energy leak into the high end of the lower band and more tightly constraining the higher end of the lower band limits of its signal energy leaking into the lower end of the higher band to have commensurate performance.

In my previous patent entitled SPREAD-SPECTRUM COMMUNICATIONS SYSTEM FOR NETWORKS, U.S. Pat. No. 5,090,024, herein incorporated by reference, a system is proposed for communicating over power lines and the like that employs chirp spread-spectrum communication techniques.

SUMMARY OF THE INVENTION

In a first aspect, the invention features dividing the chirp into two frequency-swept portions, one beginning at an intermediate frequency within the bandwidth being swept to one end of the frequency range of the chirp, and a second beginning at the other end of the frequency range and being swept to the intermediate frequency. This has the effect of moving the frequency transition from the boundaries of the chirp to its center, with the result that the discontinuities introduced at the boundaries by phase reversals due to successive modulated chirps generate less out-of-band energy. In preferred embodiments, the full frequency range of the chirp is at least about two octaves (i.e., two doublings of frequency), and the intermediate frequency is at least about one octave (i.e., a doublings of frequency), from either end of the range, whereby the one-half and double frequency components that result from phase reversals remain within the band.

In a second aspect, the invention features reducing out-of-band energy components in swept-frequency chirp communication systems, by smoothing the abrupt changes in frequency that occur at the frequency transitions between frequency swept portions.

In a third aspect, the invention features reducing out-of-band energy components by altering the shape of a progressively swept frequency chirp waveform by using as the waveform the product of truncating the frequency spectrums resulting from a series of non-phase-reversed chirp signals and a series of repeatedly phase-reversed chirp signals, transforming the truncated spectrums into the time domain, averaging the resulting frequency-truncated chirp signals, and repeating the truncating, transforming, and averaging steps. The waveform produced by these steps is typically further filtered before being placed on the communication channel.

In preferred embodiments, the chirp signals have specific waveforms defined by the values of tables in the specification. The chirps are amplified, further filtered, and coupled to AC power lines, and the frequency ranges of the chirps is 100 KHz to 400 KHz or 20 KHz to 80 KHz. Chirps of both frequency range can be transmitted simultaneously. The values of Table 2 are representative of the actual resultant waveform values obtained with the preferred embodiment as sampled on the AC power line.

The invention achieves the advantages of chirp spread-spectrum communication with a chirp waveform that produces reduced levels of out-of-band frequency components. The several aspects of the invention may be used individually, or together for added effectiveness. By reducing the level of out-of-band frequency components, the required FCC part 15 out-of-band limits may be achieved without costly filtering, and concurrent use of closely-spaced adjacent signalling bands is possible.

Other advantages and features of the invention will be apparent from the following description of a preferred embodiment and from the claims.

DESCRIPTION OF THE PREFERRED EMBODIMENT

Figure 1:
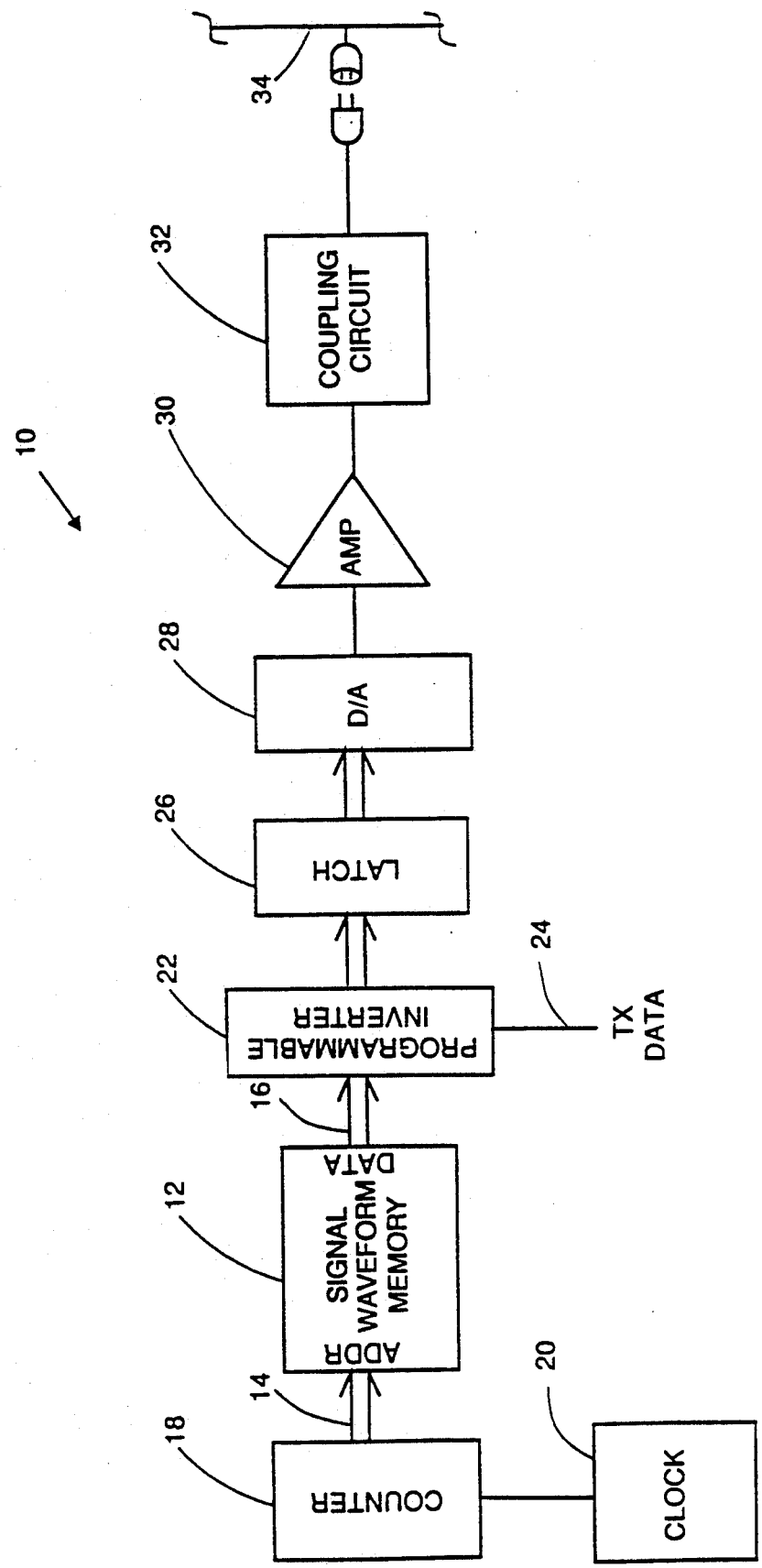
FIG. 1 is a schematic diagram of a chirp signal generator for use in chirp spread-spectrum communications according to the invention.

Referring to FIG. 1, a chirp signal generating circuit 10 for use in chirp communications includes a chirp waveform data memory element 12, such as a read-only memory (ROM), that has an address input port 14 and a data output port 16. The address port lines are responsive to the parallel output of an address counter 18, which has a clock input for receiving pulses from a clock circuit 20. The data output port 16 provides waveform data to a programmable inverter that has a pass/invert line for accepting data to be transmitted. The programmable inverter, in turn, feeds a data latch 26, and the data latch provides its output to the digital data input of a digital-to-analog converter 28. The converter supplies an analog output to an amplifier 30, which feeds a coupling circuit that may be connected to a power line 34. The above circuitry is preferably integrated into a single integrated circuit chip.

In operation the counter 18 counts pulses generated by the clock 20 and its parallel output therefore provides an increasing (or decreasing) sequence of addresses to the address port 14 of the memory element 12. This sequence of addresses causes the memory to access a series of digital chirp waveform values stored in sequential locations within the memory and to present them at the data output port 16. Each time the counter has stepped through an entire set of chirp waveform data locations, it may be reset to an arbitrary starting value and restarted, so as to step through the chirp waveform data locations repeatedly, with or without a delay between repetitions. Each repetition therefore presents digital data for a single chirp waveform at the data output port 16.

These data presented at the data output port 16 may or may not then be inverted by the programmable inverter, depending on the state of the pass/invert line. The state of the pass/invert line is generally only changed upon restarting the counter so as to provide a series of chirp waveform data sets that are each either in-phase or phase-reversed. This allows for phase-shift modulation of the series of chirp waveform data sets.

The digital-to-analog converter 28 then converts the modulated digital waveform data to a signal comprised of a phase-shift modulated series of analog chirps, which the amplifier 30 amplifies. The amplifier also filters (low-pass) the analog signal to remove quantization artifacts (anti-aliasing). The coupling circuit then couples the resulting signal onto the power line, for communication to one or more receivers connected elsewhere on the power line.

The receivers typically employ matched transversal filters to detect the chirp signals. These are described in the above-referenced U.S. Pat. No. 5,090,024, entitled SPREAD-SPECTRUM COMMUNICATIONS SYSTEM FOR NETWORKS, herein incorporated by reference. Network protocols for power lines are presented in the above-referenced application entitled TIMING FOR SPREAD-SPECTRUM NETWORK COMMUNICATION.

In one embodiment, the transmitter may transmit such that there are no pauses between successive chirps, whether successive chirps are phase-reversed (PRF) or not (NPRF), and the chirp signal is a product of a linear sweep from 100 KHz to 400 KHz over a duration of 100 microseconds. The signal waveform data used for this chirp is stored in 358 sequential memory locations and the counter is clocked at a 3.58 MHz clock rate. Other clock rates may be used with corresponding changes in the stored data points needed to represent this waveform. A plot of a sequentially generated pair 40 of these linearly swept signals 42, 44 is shown in FIG. 2.

Figure 3:
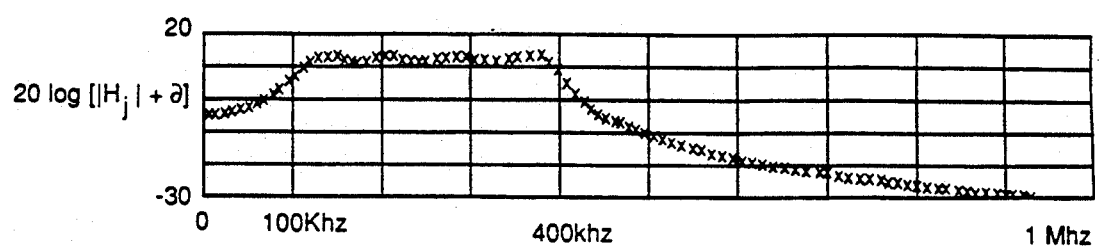
FIG. 3 is a plot of the spectral content of an infinitely repeating series of the pair of signals of FIG. 2 with power levels plotted on a logarithmic scale against a linear frequency scale.

An infinite series of these in-phase (NPRF) linearly swept chirps has the spectrum presented in FIG. 3. This spectrum contains a certain amount of energy outside of the 100-400 KHz sweep band as the result of the abrupt transition at portion 46 of the signal, where one chirp ends and the next begins. The transition generates out-of band components that are of no use in the communication of information, but create interference with the potential use of adjacent bands and thus, unless filtered, use up portions of the spectrum that could be used for other purposes.

Figure 2:
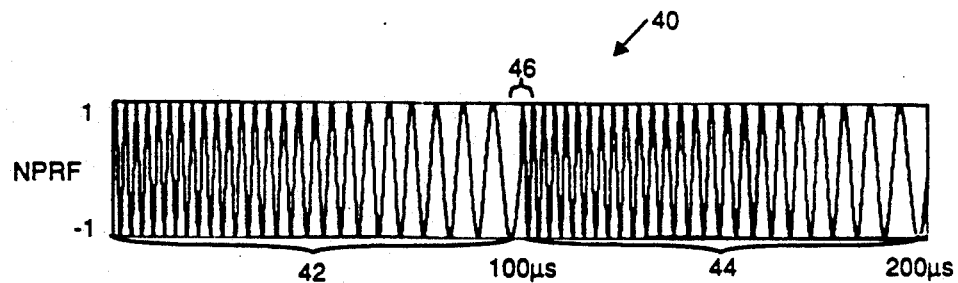
FIG. 2 is a normalized plot of a pair of sequentially generated in-phase linearly swept chirp signals.
Figure 4:
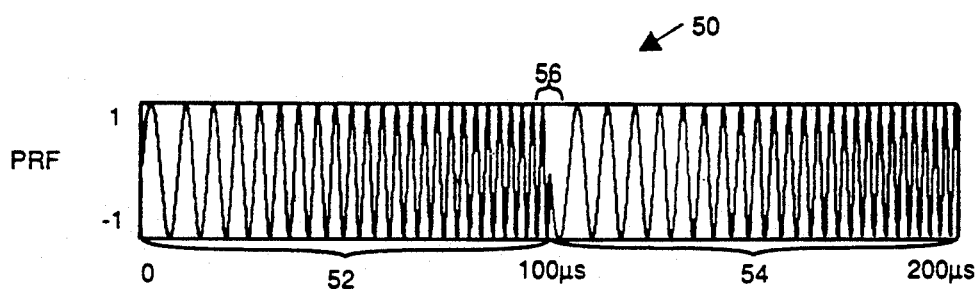
FIG. 4 is a normalized plot of a pair of sequentially generated out-of-phase linearly swept chirp signals.
Figure 5:
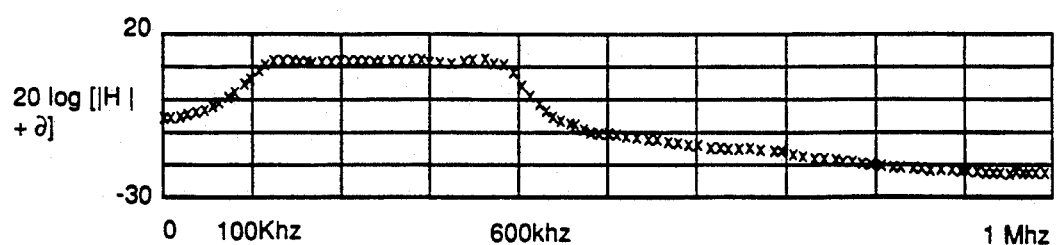
FIG. 5 is a plot of the spectral content of an infinitely repeating series of the pair of signals of FIG. 4 with power levels plotted on a logarithmic scale against a linear frequency scale.
Figure 6:
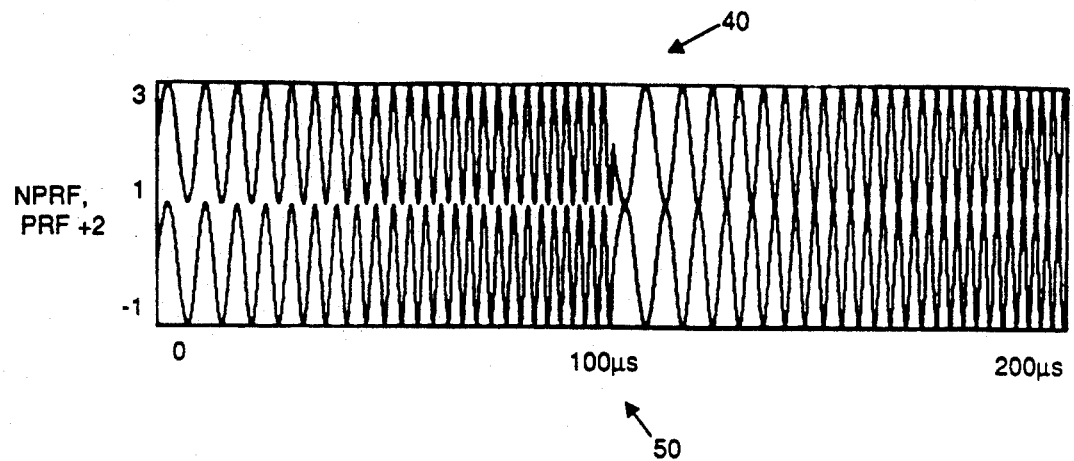
FIG. 6 is a plot of the signal of FIG. 2 below and in registration with the signal of FIG. 4.

FIG. 4 shows a pair 50 of linearly swept chirp signals 52, 54 that are identical to those shown in FIG. 2, except that the second chirp signal 54 is out-of-phase with respect to the first 52. An infinite series of these pairs of phase-reversed (PRF) linearly swept chirps would have the spectrum presented in FIG. 5. This spectrum contains even greater amounts of undesirable energy outside of the 100-400 KHz sweep band, attributable to the even more abrupt transition caused by the phase reversal.

Any arbitrary sequence of in-phase chirps 42 and out of phase chirps 54 will yield a spectrum that is a weighted sum of the spectra of FIGS. 2 and 4. Therefore, it is only necessary to consider these two cases to determine magnitude of the out-of-band spectral components for an arbitrarily modulated signal.

Figure 7:
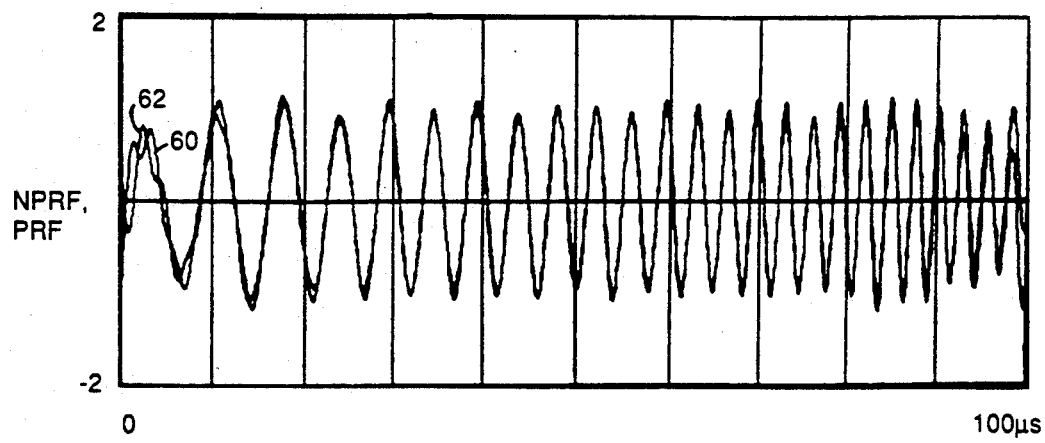
FIG. 7 is a superimposed plot of the first part of the second chirp signals of FIG. 6 shown in registration on a larger scale, after the frequency spectrum of each of them has been truncated.
Figure 8:
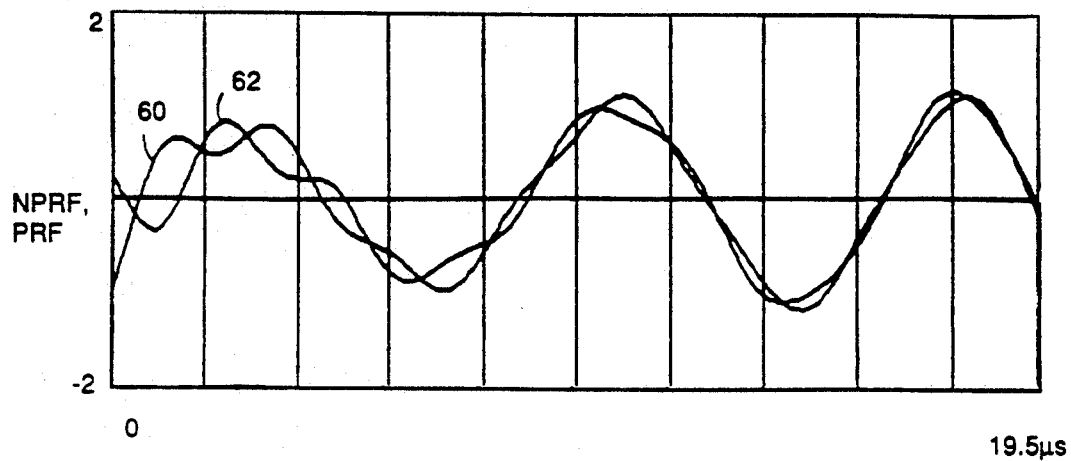
FIG. 8 is a superimposed plot of the first part of the two signals of FIG. 7, shown in registration on an even larger scale.

To design a chirp wave shape with reduced out-of-band energy, the spectrum of each of the waveforms 40, 50 was truncated, limiting its spectral contents to a range between 100 KHz and 400 KHz. This was done by performing a Fast Fourier Transform (FFT) on the waveform data and truncating the resulting transform. An inverse FFT was then performed on each set of truncated transformed data, to yield the superimposed chirp waveforms 60, 62 shown in FIGS. 7 and 8. Transforms and truncation were performed with the assistance of a general purpose computer.

Figure 9:
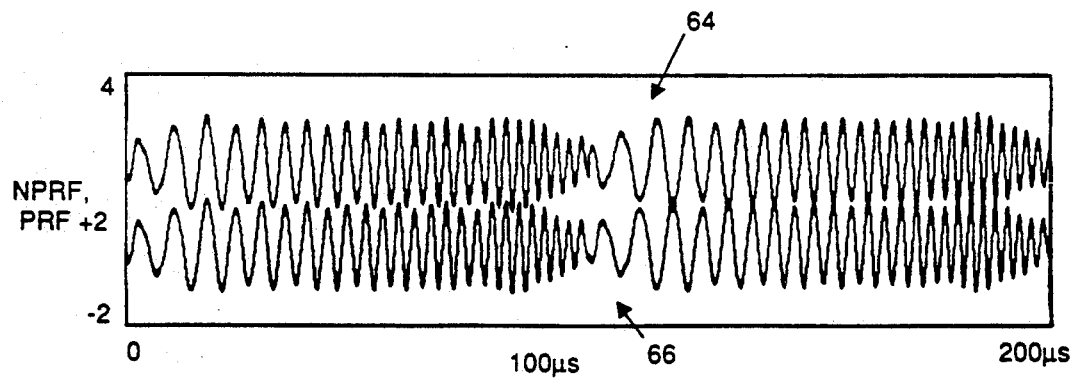
FIG. 9 is a plot of two pairs of chirp signals which are the average of the signals of FIG. 7 shown in-phase (top) and out of phase (bottom).
Figure 10:
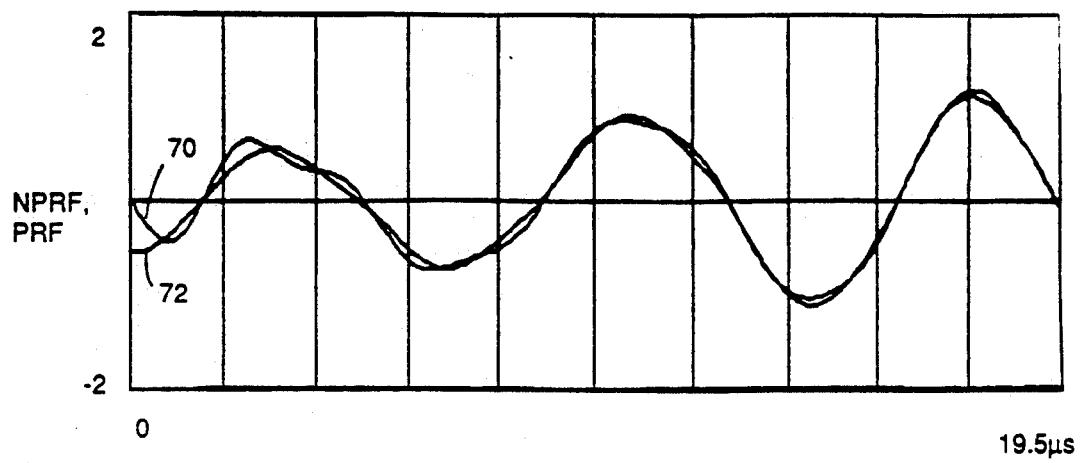
FIG. 10 is a superimposed plot of the first part of the second chirp signals of FIG. 9 shown in registration on a larger scale, after the frequency spectrum of each of them has been truncated in a second truncation operation.
Figure 11:
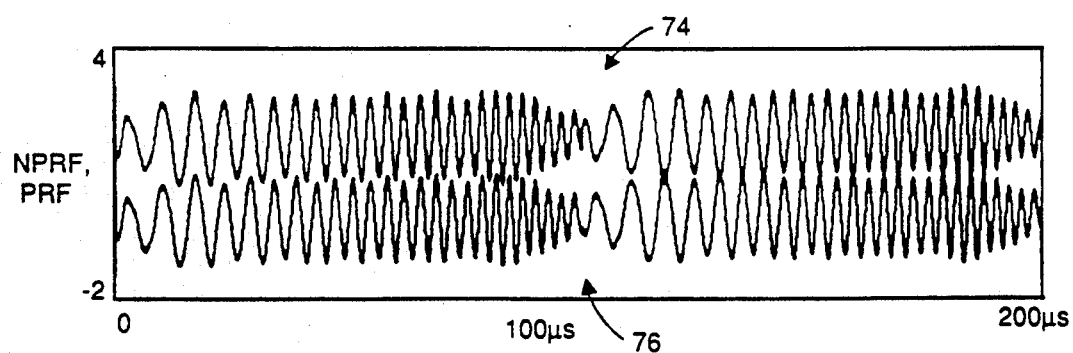
FIG. 11 is a plot of the signals of FIG. 6 after a total of six truncation and averaging operations.
Figure 12:
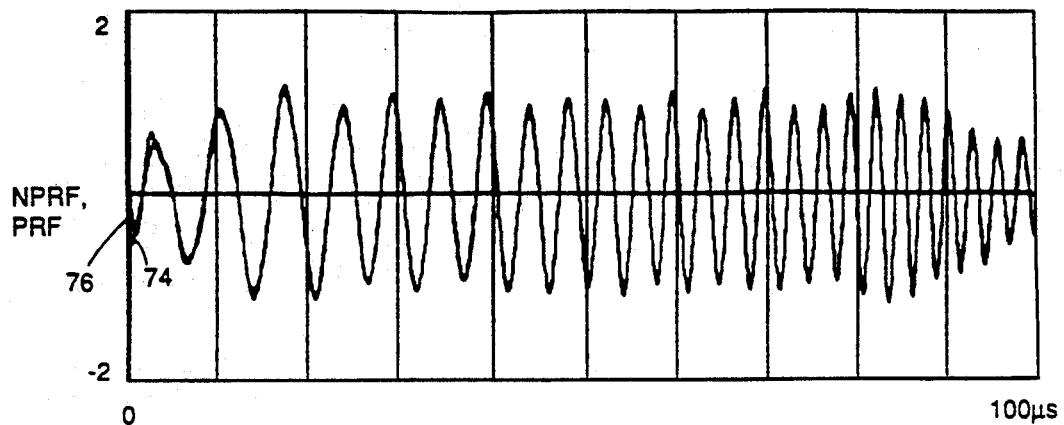
FIG. 12 is a superimposed plot of the first part of the second chirp signals of FIG. 11 shown on a larger scale.

The new truncated-spectrum waveforms 60, 62, which are not identical, were then averaged to yield a single truncated-spectrum chirp waveform, which is shown in phase-transition reversed 64 and non-phase-reversed 66 versions in FIG. 9. The process of truncation was then repeated on the spectra resulting from these waveforms 64, 66 to yield second-order truncated-spectrum waveforms 70, 72, which are shown in FIG. 10. The process of truncation and averaging was repeated four more times to yield sixth order truncated-spectrum waveforms 74, 76, which are shown in FIGS. 11 and 12. Further repetitions did not cause the waveforms to converge significantly closer together. The average of these sixth-order waveforms was then taken.

Figure 13:
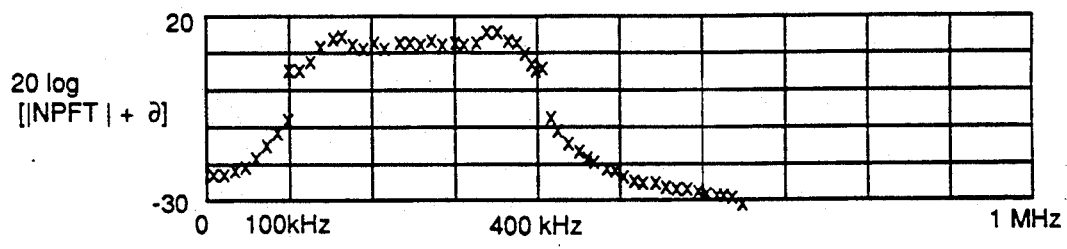
FIG. 13 is a plot of the spectral content of an infinitely repeating series of successive in-phase chirp signals, which are each the average of the pair of signals of FIG. 12, with power levels plotted on a logarithmic scale against a linear frequency scale.
Figure 14:
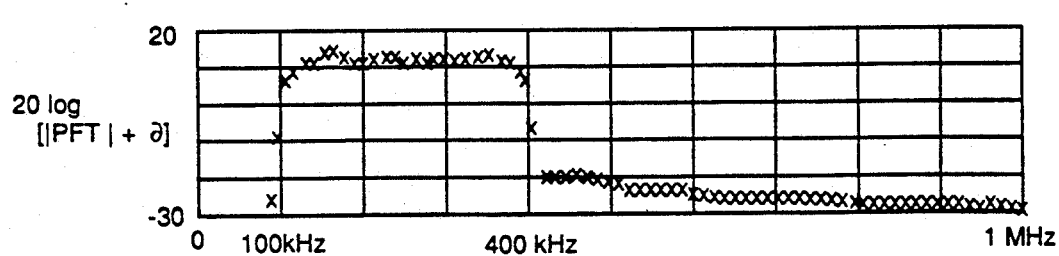
FIG. 14 is a plot of the spectral content of an infinitely repeating series of successive alternately phase reversing chirp signals, which are each the average of the pair of signals of FIG. 12, with power levels plotted on a logarithmic scale against a linear frequency scale.

The spectra resulting from non-phase reversed and phase reversed concatenations of the average of the sixth-order truncated-spectrum waveforms 74, 76 are shown in FIGS. 13 and 14, respectively. It can be seen that there is less out-of-band energy (i.e., the bandwidth is more sharply defined) in both of the spectra. The level of worst-case out-of-band energy is more than 20 dB below the power level within the sweep band, at a frequency interval of 25 KHz from the desired band (i.e., at 75 KHz and 425 KHz). This is a clear improvement over the spectra of the simple linearly swept chirp signals 40, 50 shown in FIGS. 3 and 5, where the level of out-of-band energy at the same points in frequency was closer to 10 dB below the power level within the sweep band. At 10% below the the lower end of the band (i.e., at about 90 KHz in the 100–400 KHz example), the power level of components is preferably more than 20 dB below the average power level within the bandwidth (in the preferred embodiment, it is more than 25 dB below). At 10% above the upper end of the band (i.e., at about 440 KHz in the 100–400 KHz example), the power level of components is preferably more than 30 db below the average power level within the bandwidth (in the preferred embodiment, it is more than 40 db below).

The averaged sixth-order truncated-spectrum waveform can therefore be advantageously used as data in the memory 12 of the chirp signal generator of FIG. 1, in order to communicate over power lines. This generator would then use less of the useful bandwidth available on the line than would a generator that used a simply linearly swept chirp. The same truncation and averaging process can be applied to other waveforms, such as waveforms that are not linearly swept, but that are nonetheless progressively swept.

Figure 15:
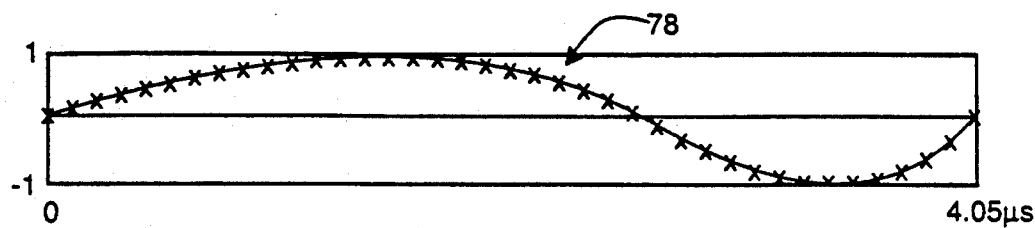
FIG. 15 is a plot of a single-period waveform that provides a linear transition beginning at a rate of change of amplitude relative to phase angle consistent with a low frequency waveform (100 KHz) and ending at a rate of change consistent with a higher frequency (400 KHz).
Figure 16:
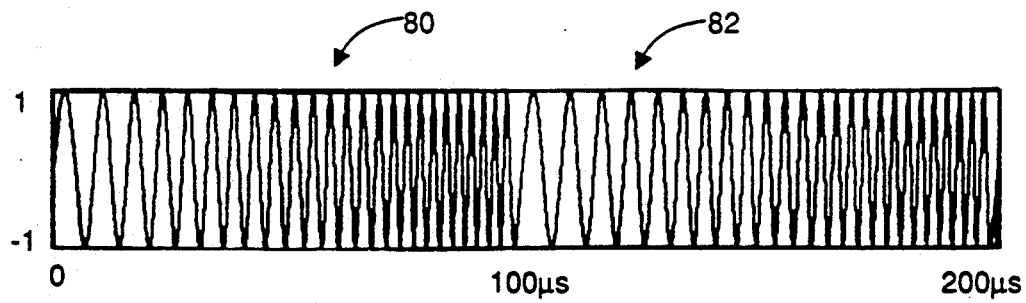
FIG. 16 is a plot of a pair of modified chirp signals being swept linearly, but with their first half-periods each being replaced with the first half-period of the waveform of FIG. 15, and their last half-periods each being replaced with the last half-period of the waveform of FIG. 15.
Figure 17:
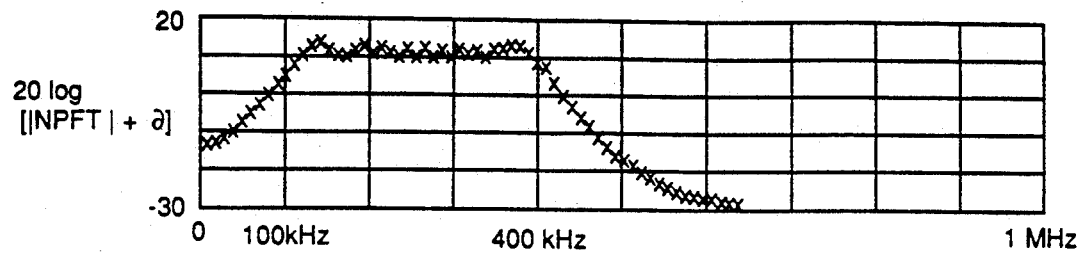
FIG. 17 is a plot of the spectral content of an infinitely repeating series of successive in-phase modified chirp signals of FIG. 16, with power levels plotted on a logarithmic scale against a linear frequency scale.
Figure 18:
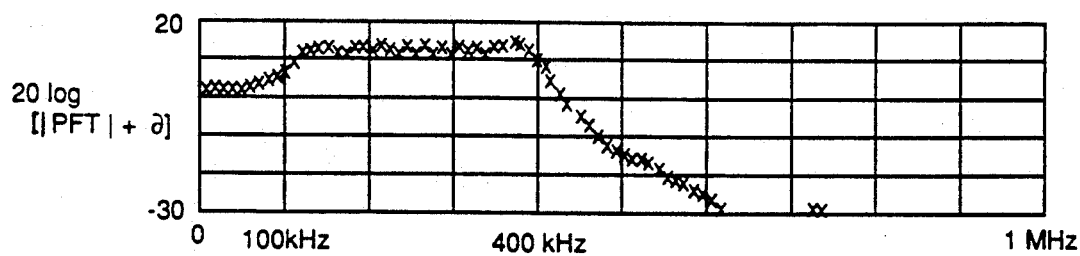
FIG. 18 is a plot of the spectral content of an infinitely repeating series of successive alternately phase reversing modified chirp signals of FIG. 16, with power levels plotted on a logarithmic scale against a linear frequency scale.

A further reduction in out of band energy can be achieved by shaping the time-domain signal at the transitions from high to low frequency (e.g., region 46 in FIG. 2). FIG. 15 shows a single-period transitional waveform 78 that can be used to effect a smoother frequency transition at these points. The waveform begins with a rate of change of amplitude relative to phase angle consistent with a low frequency waveform (100 KHz) and ends at a rate of change consistent with a higher frequency (400 KHz). In the present illustrative embodiment, the transitional waveform 78 is linearly swept, and is a total of 4.05 microseconds in duration. The first half-period of this waveform 78 may be substituted for the first half-period of the simple linearly swept chirp 42, and the second half-period substituted for the last half-period of the same simple linearly swept chirp. A pair of the resulting modified chirps 80, 82 is shown in FIG. 16, and the corresponding phase-reversed and non-phase-reversed spectra are shown in FIGS. 17 and 18.

These spectra indicate that there is somewhat of a reduction in out-of-band energy with respect to the spectra of the simple linearly swept chirp signals 40, 50 (FIGS. 2 and 4) owing to the substitution of smooth transitional waveform portions for the first and last half-periods of the chirp. The transitional waveform may extend over more than a single period, but at the expense of some loss in frequency content of the chirp within the sweep bandwidth. Also, the transitional waveform need not be swept in a linear fashion in order to reap the benefits of the invention.

Figure 19:
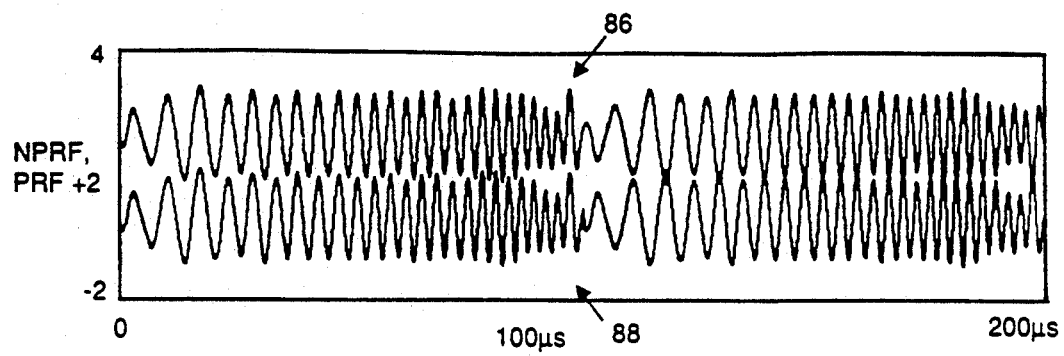
FIG. 19 is a plot of in-phase and phase-reversed pairs of the chirp signals of FIG. 16 after a total of six truncation and averaging operations.
Figure 20:
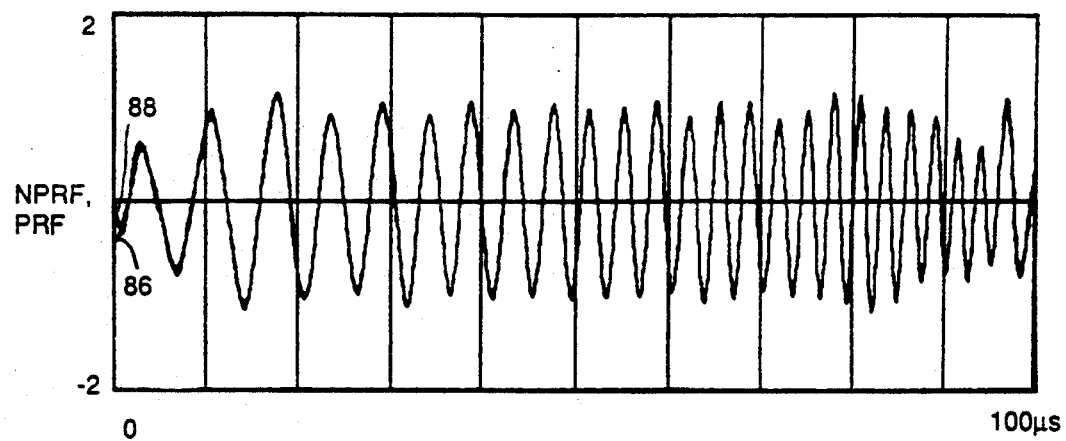
FIG. 20 is a superimposed plot of the first part of the two signals of FIG. 19 shown on a larger scale.
Figure 21:
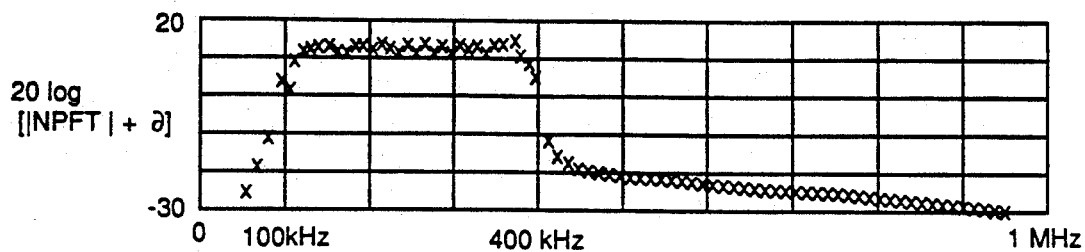
FIG. 21 is a plot of the spectral content of an infinitely repeating series of successive in-phase modified chirp signals, which are each the average of the pair of signals of FIG. 19, with power levels plotted on a logarithmic scale against a linear frequency scale.
Figure 22:
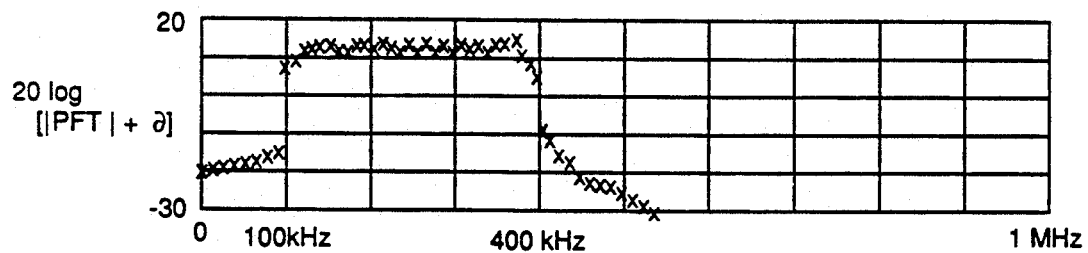
FIG. 22 is a plot of the spectral content of an infinitely repeating series of successive alternately phase reversing modified chirp signals, which are each the average of the pair of signals of FIG. 19, with power levels plotted on a logarithmic scale against a linear frequency scale.

If these modified chirps 80, 82 are further subjected to repeated truncation and averaging operations as earlier described, the reduction in out-of-band energy is improved. FIGS. 19 and 20 show sixth order truncated-spectrum modified chirps 86, 88 that result from a total of six truncation and five averaging operations, and FIGS. 21 and 22 show the spectra resulting from the average of these chirps 86, 88. These spectra confirm that there is an even more marked reduction in out-of band energy, when compared to the spectra of the simple linearly swept chirp signals 40, 50 (FIGS. 2 and 4), being approximately 30 db lower at 25 Khz from the band edges.

Figure 23:
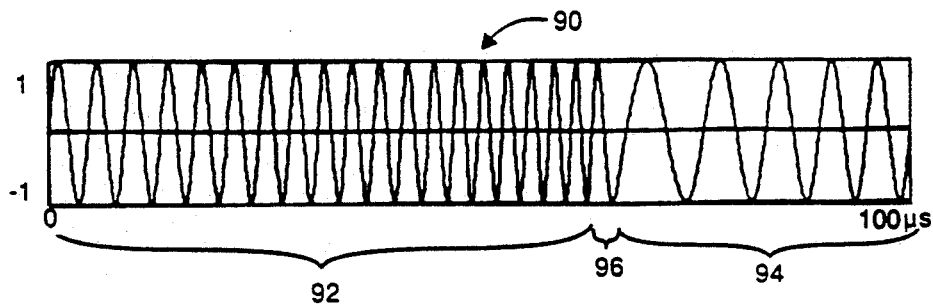
FIG. 23 is a plot of a split-wave chirp that includes a first part beginning at an intermediate frequency followed by a second ending at the same intermediate frequency, with the two parts being separated by the transition waveform of FIG. 15.

A still further reduction in out-of-band energy can be achieved by changing the manner in which the chirp is swept. FIG. 23 shows a chirp signal 90 in which the signal begins at an intermediate frequency, such as 203 KHz, and decreases over a first part 92 to a frequency at the higher end of the desired bandwidth (400 KHz). A second part 94 begins at a frequency at the lower end of the sweep bandwidth (100 KHz) and increases to the same intermediate frequency (203 KHz) at the end of the chirp. The first and second parts are separated by a transitional waveform portion 96, such as the one shown in FIG. 15, and the first and second parts are swept in a linear manner. This split-wave chirp signal may be transmitted by the generator circuit 10, and be detected by an appropriate matched filter. An equivalent mirror image of the waveform may also be produced in which frequency increases in the first part and frequency decreases in the second.

Figure 24:
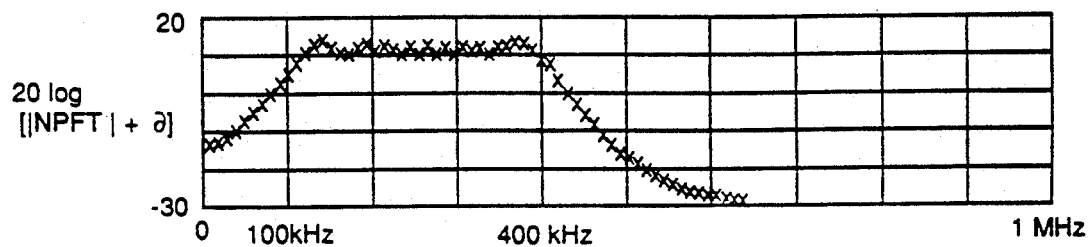
FIG. 24 is a plot of the spectral content of an infinitely repeating series of successive in-phase split-wave chirp signals of FIG. 23, with power levels plotted on a logarithmic scale against a linear frequency scale.
Figure 25:
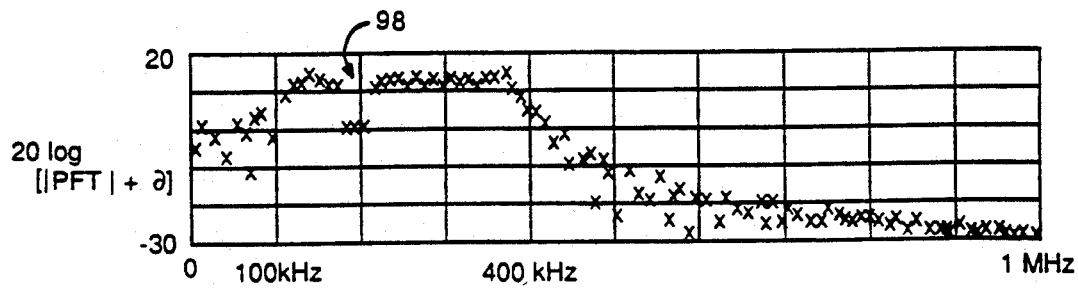
FIG. 25 is a plot of the spectral content of an infinitely repeating series of successive alternately phase reversing split-wave chirp signals of FIG. 23, with power levels plotted on a logarithmic scale against a linear frequency scale.

The in-phase and out-of-phase power spectra resulting from the split-wave chirp signal 90 are shown in FIGS. 24 and 25. These spectra indicate that there is again somewhat of a reduction in out-of-band energy with respect to the spectra of the simple linearly swept chirp signal 42 (FIGS. 2 and 4).

One reason for this improvement is that the frequency components resulting from the phase reversal between chirps of opposing phase have been moved within the desired band. A significant proportion of these components tend to be found at either half or twice the frequency of the signal at the phase reversal. As the phase reversal now occurs at 203 KHz, instead of at the transition from 100 to 400 KHz, the added components are at 101.5 KHz and 406 KHz, which are generally within the desired band. This advantageous placement of phase-reversal artifact energy within the desired band is possible if the signal spans more than two octaves. Embodiments that use bands that span less than two octaves will not find all of this artifact energy generated within the desired band, but may still benefit from the application of the split-wave technique. Some energy is lost at the intermediate frequency (203 KHz) with this technique, as evidenced by the gap in the spectrum of FIG. 25.

Figure 26:
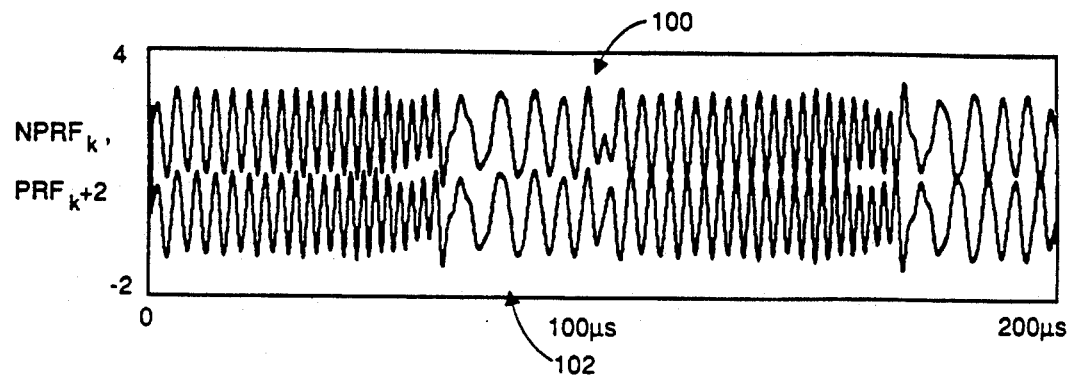
FIG. 26 is a plot of phase-reversed and in-phase pairs of the signals of FIG. 23, shown in registration after a total of six truncation and averaging operations.
Figure 27:
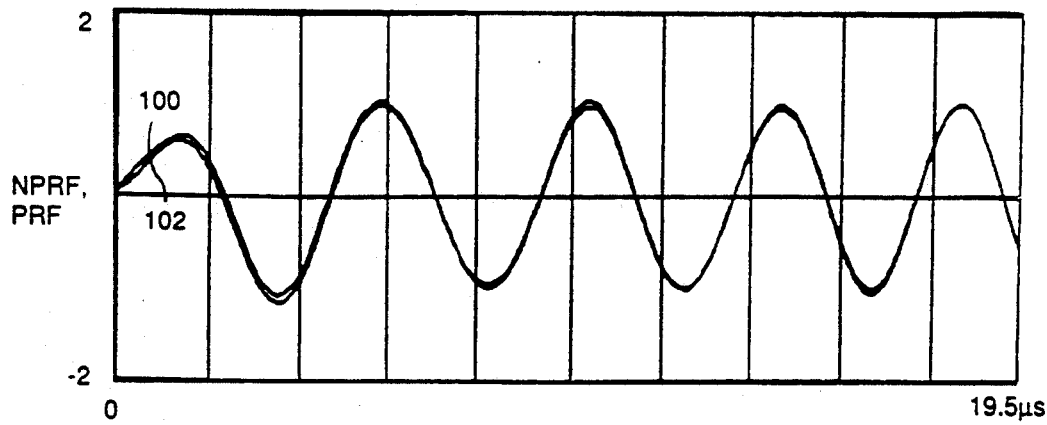
FIG. 27 is a superimposed plot of the first part of the second chirp signals of FIG. 26 shown on a larger scale.

If this split-wave chirp 90 is subjected to the repeated truncation and averaging operations described earlier, its out-of-band energy level is further improved. FIGS. 26 and 27 show sixth-order split-wave chirps 100, 102 after a total of six truncation and five averaging operations. These have converged to be quite close, and the average of the two (FIG. 28) is quite similar to each of them. This close convergence is believed to be due to the fact that the truncation operations did not affect the phase-reversal components, 101.5 KHz and 406 KHz energy, which are now within the desired band.

Figure 28:
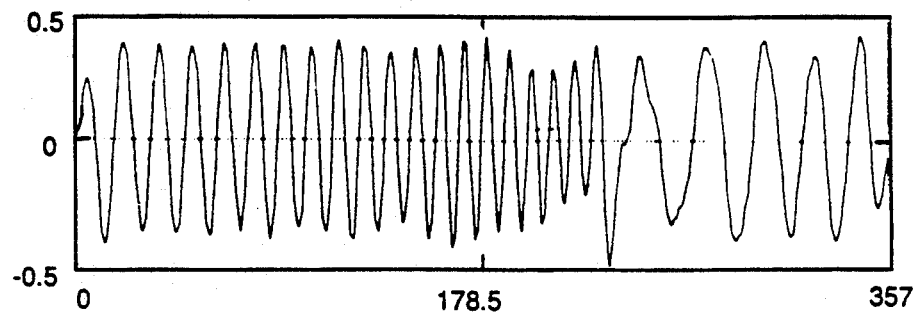
FIG. 28 is a plot of the average of the sixth-order truncated-spectrum split-wave chirp signals of FIG. 26.

The chirp signal waveform 104 obtained by taking the average of the sixth-order truncated-spectrum split-wave chirp signals 100, 102 is presented in FIG. 28. This waveform begins at 203 KHz and reaches a frequency of 400KHz in 66 microseconds (19 full cycles). A 4 microsecond transition portion then brings the frequency down to 100 KHz over a single cycle. The transition portion is followed by an increase from 100 KHz to 203 KHz in 33 microseconds. The entire waveform is 100 microseconds long, spanning a total of 25 cycles.

Figure 29:
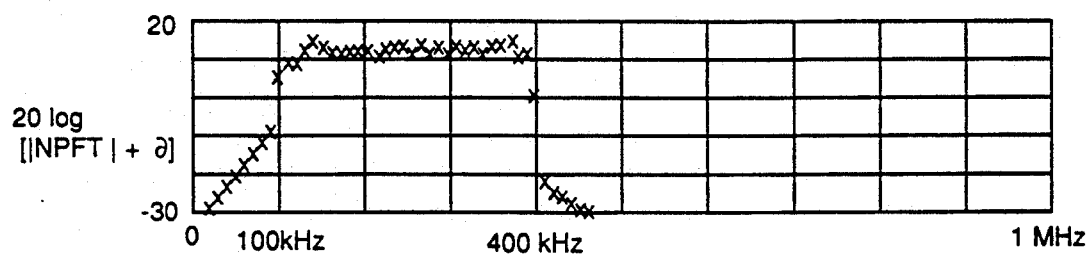
FIG. 29 is a plot of the spectral content of an infinitely repeating series of successive in-phase split-wave chirp signals of FIG. 28, with power levels plotted on a logarithmic scale against a linear frequency scale.
Figure 30:
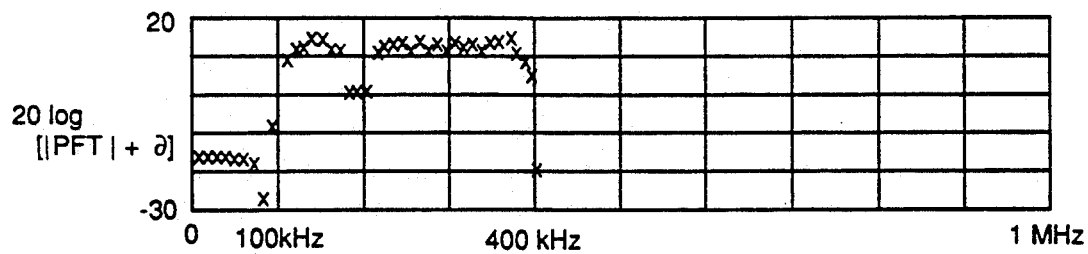
FIG. 30 is a plot of the spectral content of an infinitely repeating series of successive alternatively phase reversing split-wave chirp signals that are each the average of the chirp signals of FIG. 26, with power levels plotted on a logarithmic scale against a linear frequency scale.

FIGS. 29 and 30 show the spectra of the average of the sixth-order truncated-spectrum split-wave chirps 100, 102. These indicate that there is an even more marked reduction in out-of band energy, when compared to the spectra of the simple linearly swept chirp signal 42 (FIGS. 2 and 4). Indeed, the power level of frequency components 25 KHz outside of the defined bandwidth on the high side and low side are approximately 40 dB and 25 db respectively below the average power level within the defined bandwidth for both the in-phase and phase-reversed split-wave spectra. This waveform may therefore be modulated in an arbitrary fashion using the signal generator of FIG. 1, while only generating a minimum amount of energy outside of the desired bandwidth. It is noted that the spectrum within the desired band is only slightly different from that produced by a linearly swept chirp, and a matched filter for this waveform will perform with similar noise immunity to that designed for a linearly swept chirp.

Figure 31:
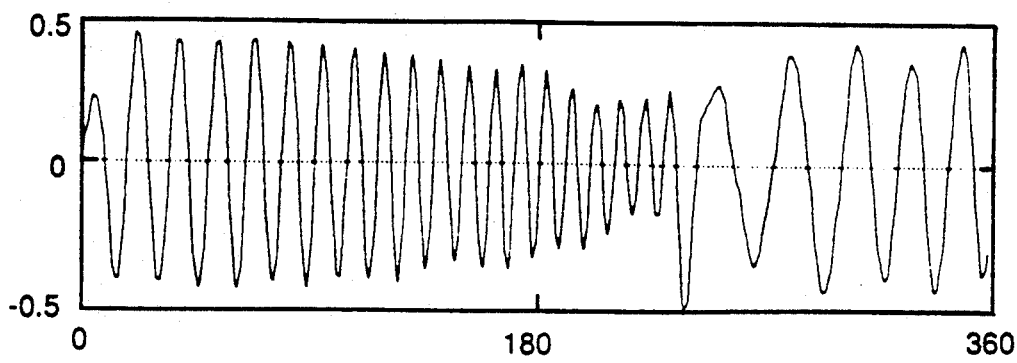
FIG. 31 is a plot of an actual waveform of the chirp of FIG. 29 after it has been amplified, further filtered and coupled to a power line.

Table 1 presents 358 points defining this proposed waveform exactly. The transmitted chirp waveform present on the power line itself will often differ from the chirp wavefrom in this table. These differences are due to the fact that the Table 1 output of the ROM 12 is converted to an analog signal in the D/A 28, passed through the amplifier/filter 30, and then the frequency and impedance matching characteristic of the coupling circuit 32 before reaching the power line. This analog processing of the waveform further filters the waveform as well as introducing other non-linearities to the waveform. An example of a digitally sampled version of the chirp waveform as seen on power line after generation by the preferred embodiment is shown in FIG. 31 and a table of 360 points defining this waveform is given in Table 2.

In the preferred embodiment for use on the power line, this waveform is specified to be transmitted at an amplitude between 3 and 7 volts peak-to-peak. Such an embodiment with appropriate inexpensive filtering should enable generally reliable power line communications that satisfy the FCC part 15 requirements for carrier current conducted emissions.

Other embodiments are within the following claims. While the detailed description has been presented with respect to 100 microsecond pulses and a 100 Khz to 400 KHz bandwidth, the invention may readily be applied to other pulse durations and bandwidths. For example, a simple time scaling by a factor of one-fifth produces a chirp with identical spectra shaping, but over a frequency range of 20 Khz to 80 Khz. The time duration of this chirp is 500 microseconds. This lower frequency chirp can be advantageously used simultaneously on the same power line with the 100 Khz to 400 Khz chirp. Linear sweeps and the like may be replaced with less exacting progressive sweeps in connection with the principles of the invention without giving up the benefits thereof. Furthermore, various substitutions may be made in the signal generator, such as using analog modulation circuitry to replace the digital programmable inverter.

TABLE 1

| | | | | | | | | | | | | | | | |
|---|---|---|---|---|---|---|---|---|---|---|---|---|---|---|---|
| 0 | 0.0625 | 45 | −0.6363 | 90 | 0.5625 | 135 | −0.3125 | 180 | 0.8125 | 225 | −0.1250 | 270 | −0.1250 | 315 | −0.7188 |
| 1 | 0.1563 | 46 | −0.4375 | 91 | 0.7188 | 136 | 0.0938 | 181 | 0.7188 | 226 | 0.2500 | 271 | 0.0938 | 316 | −0.5938 |
| 2 | 0.2500 | 47 | −0.1875 | 92 | 0.7188 | 137 | 0.4375 | 182 | 0.3750 | 227 | 0.5938 | 272 | 0.2813 | 317 | −0.4063 |
| 3 | 0.3750 | 48 | 0.1250 | 93 | 0.5313 | 138 | 0.6563 | 183 | −0.0938 | 228 | 0.7500 | 273 | 0.4688 | 318 | −0.1875 |
| 4 | 0.4688 | 49 | 0.4063 | 94 | 0.2188 | 139 | 0.6875 | 184 | −0.5313 | 229 | 0.6875 | 274 | 0.6250 | 319 | 0.0000 |
| 5 | 0.4688 | 50 | 0.6250 | 95 | −0.1563 | 140 | 0.5000 | 185 | −0.7188 | 230 | 0.3750 | 275 | 0.6875 | 320 | 0.1875 |
| 6 | 0.4063 | 51 | 0.7188 | 96 | −0.4688 | 141 | 0.1875 | 186 | −0.5938 | 231 | −0.0938 | 276 | 0.7188 | 321 | 0.3750 |
| 7 | 0.2500 | 52 | 0.6875 | 97 | −0.6563 | 142 | −0.1875 | 187 | −0.2500 | 232 | −0.5313 | 277 | 0.7188 | 322 | 0.5000 |
| 8 | 0.0313 | 53 | 0.5313 | 98 | −0.6875 | 143 | −0.5313 | 188 | 0.2188 | 233 | −0.8750 | 278 | 0.6875 | 323 | 0.5938 |
| 9 | −0.2500 | 54 | 0.2500 | 99 | −0.5625 | 144 | −0.6563 | 189 | 0.5938 | 234 | −1.0000 | 279 | 0.6563 | 324 | 0.6563 |
| 10 | −0.5000 | 55 | −0.0625 | 100 | −0.2813 | 145 | −0.5938 | 190 | 0.7188 | 235 | −0.9063 | 280 | 0.5938 | 325 | 0.6563 |
| 11 | −0.7188 | 56 | −0.4063 | 101 | 0.0625 | 146 | −0.3438 | 191 | 0.5625 | 236 | −0.6875 | 281 | 0.5313 | 326 | 0.6250 |
| 12 | −0.8125 | 57 | −0.6563 | 102 | 0.4063 | 147 | 0.0625 | 192 | 0.1875 | 237 | −0.4375 | 282 | 0.4063 | 327 | 0.5000 |
| 13 | −0.7813 | 58 | −0.7500 | 103 | 0.6250 | 148 | 0.4375 | 193 | −0.2813 | 238 | −0.2188 | 283 | 0.2500 | 328 | 0.3125 |
| 14 | −0.6563 | 59 | −0.7188 | 104 | 0.7188 | 149 | 0.6875 | 194 | −0.6250 | 239 | −0.0938 | 284 | 0.0313 | 329 | 0.0625 |
| 15 | −0.4063 | 60 | −0.5313 | 105 | 0.6250 | 150 | 0.7188 | 195 | −0.7188 | 240 | −0.0313 | 285 | −0.1875 | 330 | −0.1875 |
| 16 | −0.1250 | 61 | −0.2188 | 106 | 0.3750 | 151 | 0.5313 | 196 | −0.5313 | 241 | −0.0313 | 286 | −0.4063 | 331 | −0.4375 |
| 17 | 0.1875 | 62 | 0.1250 | 107 | 0.0313 | 152 | 0.1563 | 197 | −0.1250 | 242 | 0.0000 | 287 | −0.5938 | 332 | −0.6563 |
| 18 | 0.4375 | 63 | 0.4375 | 108 | −0.3438 | 153 | −0.2813 | 198 | 0.2813 | 243 | 0.0938 | 288 | −0.7188 | 333 | −0.7500 |
| 19 | 0.6563 | 64 | 0.6563 | 109 | −0.6250 | 154 | −0.6250 | 199 | 0.5313 | 244 | 0.2500 | 289 | −0.7813 | 334 | −0.7813 |
| 20 | 0.7500 | 65 | 0.7500 | 110 | −0.7188 | 155 | −0.7813 | 200 | 0.5625 | 245 | 0.4063 | 290 | −0.7813 | 335 | −0.7500 |
| 21 | 0.7500 | 66 | 0.6875 | 111 | −0.6583 | 156 | −0.6583 | 201 | 0.3125 | 246 | 0.5625 | 291 | −0.7500 | 336 | −0.6250 |
| 22 | 0.6563 | 67 | 0.5000 | 112 | −0.3750 | 157 | −0.2813 | 202 | −0.0625 | 247 | 0.6563 | 292 | −0.7188 | 337 | −0.4688 |
| 23 | 0.4688 | 68 | 0.1875 | 113 | 0.0000 | 158 | 0.1875 | 203 | −0.4375 | 248 | 0.6563 | 293 | −0.6563 | 338 | −0.2813 |
| 24 | 0.2188 | 69 | −0.1250 | 114 | 0.4063 | 159 | 0.5625 | 204 | −0.6563 | 249 | 0.5938 | 294 | −0.5313 | 339 | −0.0625 |
| 25 | −0.0313 | 70 | −0.4063 | 115 | 0.6875 | 160 | 0.7500 | 205 | −0.5938 | 250 | 0.5000 | 295 | −0.4063 | 340 | 0.1563 |
| 26 | −0.3125 | 71 | −0.6250 | 116 | 0.7813 | 161 | 0.6563 | 206 | −0.3125 | 251 | 0.3750 | 296 | −0.2188 | 341 | 0.3750 |
| 27 | −0.5313 | 72 | −0.7188 | 117 | 0.6563 | 162 | 0.3125 | 207 | 0.0625 | 252 | 0.3125 | 297 | −0.0313 | 342 | 0.5625 |
| 28 | −0.6875 | 73 | −0.6250 | 118 | 0.3125 | 163 | −0.1563 | 208 | 0.4063 | 253 | 0.2813 | 298 | 0.2188 | 343 | 0.7188 |
| 29 | −0.7188 | 74 | −0.4375 | 119 | −0.0938 | 164 | −0.5938 | 209 | 0.5625 | 254 | 0.2188 | 299 | 0.4375 | 344 | 0.8125 |
| 30 | −0.6250 | 75 | −0.1250 | 120 | −0.5000 | 165 | −0.8438 | 210 | 0.4688 | 255 | 0.1875 | 300 | 0.6250 | 345 | 0.8125 |
| 31 | −0.4375 | 76 | 0.1875 | 121 | −0.7500 | 166 | −0.7500 | 211 | 0.1875 | 256 | 0.0625 | 301 | 0.7500 | 346 | 0.7188 |
| 32 | −0.1563 | 77 | 0.5000 | 122 | −0.7813 | 167 | −0.4375 | 212 | −0.1563 | 257 | −0.0625 | 302 | 0.7813 | 347 | 0.5000 |
| 33 | 0.1563 | 78 | 0.6875 | 123 | −0.5938 | 168 | 0.0625 | 213 | −0.4375 | 258 | −0.2500 | 303 | 0.7813 | 348 | 0.2500 |
| 34 | 0.4375 | 79 | 0.7500 | 124 | −0.2500 | 169 | 0.5313 | 214 | −0.5000 | 259 | −0.4375 | 304 | 0.6875 | 349 | −0.0313 |
| 35 | 0.6563 | 80 | 0.6250 | 125 | 0.1875 | 170 | 0.7813 | 215 | −0.3125 | 260 | −0.5625 | 305 | 0.5938 | 350 | −0.2813 |
| 36 | 0.7500 | 81 | 0.3438 | 126 | 0.5313 | 171 | 0.7500 | 216 | 0.0000 | 261 | −0.6563 | 306 | 0.4688 | 351 | −0.4688 |
| 37 | 0.7188 | 82 | −0.0313 | 127 | 0.7188 | 172 | 0.4063 | 217 | 0.3750 | 262 | −0.6563 | 307 | 0.3125 | 352 | −0.5313 |
| 38 | 0.5625 | 83 | −0.3750 | 128 | 0.6875 | 173 | −0.0938 | 218 | 0.5938 | 263 | −0.6250 | 308 | 0.1563 | 353 | −0.5000 |
| 39 | 0.2813 | 84 | −0.6563 | 129 | 0.4375 | 174 | −0.5313 | 219 | 0.6250 | 264 | −0.5938 | 309 | −0.0313 | 354 | −0.4063 |
| 40 | 0.0000 | 85 | −0.7813 | 130 | 0.0625 | 175 | −0.7813 | 220 | 0.4063 | 265 | −0.5313 | 310 | −0.2188 | 355 | −0.2813 |
| 41 | −0.3125 | 86 | −0.7188 | 131 | −0.3438 | 176 | −0.6875 | 221 | 0.0625 | 266 | −0.5000 | 311 | −0.4375 | 356 | −0.1563 |
| 42 | −0.5625 | 87 | −0.5000 | 132 | −0.6250 | 177 | −0.3438 | 222 | −0.2500 | 267 | −0.4375 | 312 | −0.5938 | 357 | −0.0625 |
| 43 | −0.7188 | 88 | −0.1250 | 133 | −0.7188 | 178 | 0.1250 | 223 | −0.4375 | 268 | −0.3750 | 313 | −0.7188 | | |
| 44 | −0.7188 | 89 | 0.2500 | 134 | −0.5938 | 179 | 0.5938 | 224 | −0.4063 | 269 | −0.2813 | 314 | −0.7500 | | |

TABLE 2

| # | val | # | val | # | val | # | val | # | val | # | val | # | val | # | val |
|---|---|---|---|---|---|---|---|---|---|---|---|---|---|---|---|
| 0 | 0.0000 | 45 | −0.4295 | 90 | −0.0536 | 135 | −0.3597 | 180 | −0.1073 | 225 | −0.1019 | 270 | −0.0644 | 315 | −0.3758 |
| 1 | 0.0816 | 46 | −0.3944 | 91 | 0.1479 | 136 | −0.3426 | 181 | 0.0898 | 226 | −0.1727 | 271 | −0.0214 | 316 | −0.3865 |
| 2 | 0.1328 | 47 | −0.2861 | 92 | 0.3134 | 137 | −0.2216 | 182 | 0.2509 | 227 | −0.1645 | 272 | 0.0450 | 317 | −0.3758 |
| 3 | 0.1827 | 48 | −0.1417 | 93 | 0.4032 | 138 | −0.0450 | 183 | 0.3223 | 228 | −0.0615 | 273 | 0.1182 | 318 | −0.3192 |
| 4 | 0.2149 | 49 | 0.0277 | 94 | 0.3829 | 139 | 0.1366 | 184 | 0.2717 | 229 | 0.0706 | 274 | 0.1903 | 319 | −0.2377 |
| 5 | 0.2149 | 50 | 0.1922 | 95 | 0.2805 | 140 | 0.2936 | 185 | 0.1194 | 230 | 0.1922 | 275 | 0.2680 | 320 | −0.1300 |
| 6 | 0.2041 | 51 | 0.3230 | 96 | 0.0953 | 141 | 0.3545 | 186 | −0.0765 | 231 | 0.2578 | 276 | 0.3330 | 321 | −0.0099 |
| 7 | 0.1585 | 52 | 0.4001 | 97 | −0.0992 | 142 | 0.3048 | 187 | −0.2281 | 232 | 0.2122 | 277 | 0.3760 | 322 | 0.1101 |
| 8 | 0.0784 | 53 | 0.4082 | 98 | −0.2729 | 143 | 0.1651 | 188 | −0.2899 | 233 | 0.0815 | 278 | 0.3836 | 323 | 0.2087 |
| 9 | −0.0246 | 54 | 0.3351 | 99 | −0.3790 | 144 | −0.0235 | 189 | −0.2578 | 234 | −0.1116 | 279 | 0.3652 | 324 | 0.2857 |
| 10 | −0.1479 | 55 | 0.1916 | 100 | −0.3865 | 145 | −0.1992 | 190 | −0.0906 | 235 | −0.3090 | 280 | 0.3330 | 325 | 0.3330 |
| 11 | −0.2628 | 56 | 0.0225 | 101 | −0.3174 | 146 | −0.3111 | 191 | 0.0855 | 236 | −0.4610 | 281 | 0.2849 | 326 | 0.3542 |
| 12 | −0.3550 | 57 | −0.1517 | 102 | −0.1589 | 147 | −0.3328 | 192 | 0.2163 | 237 | −0.5000 | 282 | 0.2142 | 327 | 0.3437 |
| 13 | −0.3973 | 58 | −0.3040 | 103 | 0.0283 | 148 | −0.2436 | 193 | 0.2578 | 238 | −0.4600 | 283 | 0.1541 | 328 | 0.3099 |
| 14 | −0.3973 | 59 | −0.4053 | 104 | 0.2039 | 149 | −0.0753 | 194 | 0.1963 | 239 | −0.3383 | 284 | 0.0834 | 329 | 0.2498 |
| 15 | −0.3257 | 60 | −0.4295 | 105 | 0.3419 | 150 | 0.1111 | 195 | 0.0377 | 240 | −0.1861 | 285 | 0.0126 | 330 | 0.1469 |
| 16 | −0.2056 | 61 | −0.3560 | 106 | 0.3867 | 151 | 0.2669 | 196 | −0.1379 | 241 | −0.0338 | 286 | −0.0842 | 331 | 0.0447 |
| 17 | −0.0533 | 62 | −0.2197 | 107 | 0.3435 | 152 | 0.3385 | 197 | −0.2578 | 242 | 0.0862 | 287 | −0.1826 | 332 | −0.0806 |
| 18 | 0.1161 | 63 | −0.0397 | 108 | 0.1955 | 153 | 0.2986 | 198 | −0.2899 | 243 | 0.1612 | 288 | −0.2641 | 333 | −0.2061 |
| 19 | 0.2619 | 64 | 0.1511 | 109 | 0.0135 | 154 | 0.1497 | 199 | −0.2106 | 244 | 0.1827 | 289 | −0.3436 | 334 | −0.3261 |
| 20 | 0.3736 | 65 | 0.3067 | 110 | −0.1777 | 155 | −0.0441 | 200 | −0.0608 | 245 | 0.2041 | 290 | −0.3949 | 335 | −0.3847 |
| 21 | 0.4404 | 66 | 0.4053 | 111 | −0.3300 | 156 | −0.2319 | 201 | 0.0939 | 246 | 0.2134 | 291 | −0.4295 | 336 | −0.4295 |
| 22 | 0.4301 | 67 | 0.4140 | 112 | −0.3968 | 157 | −0.3436 | 202 | 0.1929 | 247 | 0.2363 | 292 | −0.4295 | 337 | −0.4197 |
| 23 | 0.3652 | 68 | 0.3428 | 113 | −0.3592 | 158 | −0.3534 | 203 | 0.2041 | 248 | 0.2471 | 293 | −0.4022 | 338 | −0.3646 |
| 24 | 0.2442 | 69 | 0.2091 | 114 | −0.2226 | 159 | −0.2372 | 204 | 0.1154 | 249 | 0.2714 | 294 | −0.3514 | 339 | −0.2791 |
| 25 | 0.0997 | 70 | 0.0251 | 115 | −0.0333 | 160 | −0.0465 | 205 | −0.0262 | 250 | 0.2793 | 295 | −0.2821 | 340 | −0.1586 |
| 26 | −0.0529 | 71 | −0.1636 | 116 | 0.1679 | 161 | 0.1443 | 206 | −0.1610 | 251 | 0.2599 | 296 | −0.2006 | 341 | −0.0362 |
| 27 | −0.2115 | 72 | −0.3028 | 117 | 0.3104 | 162 | 0.2879 | 207 | −0.2362 | 252 | 0.2213 | 297 | −0.1202 | 342 | 0.0839 |
| 28 | −0.3218 | 73 | −0.3971 | 118 | 0.3760 | 163 | 0.3224 | 208 | −0.2202 | 253 | 0.1613 | 298 | −0.0269 | 343 | 0.2039 |
| 29 | −0.3973 | 74 | −0.4018 | 119 | 0.3520 | 164 | 0.2392 | 209 | −0.1164 | 254 | 0.1013 | 299 | 0.0753 | 344 | 0.2962 |
| 30 | −0.4008 | 75 | −0.3310 | 120 | 0.1970 | 165 | 0.0663 | 210 | 0.0251 | 255 | 0.0413 | 300 | 0.1648 | 345 | 0.3670 |
| 31 | −0.3596 | 76 | −0.1904 | 121 | −0.0002 | 166 | −0.1424 | 211 | 0.1559 | 256 | −0.0161 | 301 | 0.2606 | 346 | 0.4108 |
| 32 | −0.2610 | 77 | −0.0173 | 122 | −0.2097 | 167 | −0.2973 | 212 | 0.2239 | 257 | −0.0536 | 302 | 0.3421 | 347 | 0.4189 |
| 33 | −0.1148 | 78 | 0.1690 | 123 | −0.3590 | 168 | −0.3643 | 213 | 0.1887 | 258 | −0.0858 | 303 | 0.3960 | 348 | 0.3781 |
| 34 | 0.0648 | 79 | 0.3120 | 124 | −0.4078 | 169 | −0.2894 | 214 | 0.0855 | 259 | −0.1400 | 304 | 0.4189 | 349 | 0.3059 |
| 35 | 0.2065 | 80 | 0.4082 | 125 | −0.3412 | 170 | −0.1157 | 215 | −0.0369 | 260 | −0.1932 | 305 | 0.4082 | 350 | 0.1803 |
| 36 | 0.3373 | 81 | 0.3867 | 126 | −0.1846 | 171 | 0.0871 | 216 | −0.1417 | 261 | −0.2437 | 306 | 0.3738 | 351 | 0.0312 |
| 37 | 0.4082 | 82 | 0.2915 | 127 | 0.0255 | 172 | 0.2640 | 217 | −0.1717 | 262 | −0.2930 | 307 | 0.3008 | 352 | −0.1211 |
| 38 | 0.4082 | 83 | 0.1316 | 128 | 0.2122 | 173 | 0.3424 | 218 | −0.1099 | 263 | −0.3328 | 308 | 0.2068 | 353 | −0.2349 |
| 39 | 0.3334 | 84 | −0.0686 | 129 | 0.3430 | 174 | 0.2908 | 219 | −0.0006 | 264 | −0.3436 | 309 | 0.0975 | 354 | −0.3321 |
| 40 | 0.1922 | 85 | −0.2594 | 130 | 0.3652 | 175 | 0.1266 | 220 | 0.1301 | 265 | −0.3322 | 310 | 0.0096 | 355 | −0.3752 |
| 41 | 0.0277 | 86 | −0.3827 | 131 | 0.2746 | 176 | −0.0813 | 211 | 0.2072 | 266 | −0.2899 | 311 | −0.0981 | 356 | −0.3474 |
| 42 | −0.1524 | 87 | −0.4295 | 132 | 0.1053 | 177 | −0.2519 | 222 | 0.2285 | 267 | −0.2362 | 312 | −0.1875 | 357 | −0.2874 |
| 43 | −0.2968 | 88 | −0.3796 | 133 | −0.1035 | 178 | −0.3221 | 223 | 0.1508 | 268 | −0.1844 | 313 | −0.2684 | 358 | −0.1970 |
| 44 | −0.3963 | 89 | −0.2444 | 134 | −0.2753 | 179 | −0.2640 | 224 | 0.0235 | 269 | −0.1244 | 314 | −0.3319 | 359 | −0.0985 |
| | | | | | | | | | | | | | | 360 | 0.0000 |

I claim:

1. A method of chirp spread-spectrum communication comprising the steps of
   generating a series of swept-frequency chirp signals, in which frequency is swept within a defined bandwidth;
   modulating said chirp signals by reversing their phase, so that there are phase-reversed and non-phase-reversed chirp signals;
   concatenating the modulated chirp signals to form a transmitted signal;
   each chirp signal comprising two frequency-swept portions,
   a first portion in which frequency is progressively swept from an intermediate frequency within said defined bandwidth to a frequency at one end of said defined bandwidth, and
   a second portion following said first portion and in which frequency is progressively swept from a frequency at the other end of said defined bandwidth to said intermediate frequency,
   wherein within each chirp signal there is a transition in frequency from the frequency at one end of said defined bandwidth to the frequency at the other end of said defined bandwidth.

2. The method of claim 1 wherein said defined bandwidth spans at least about two frequency octaves and wherein said intermediate frequency is at least about one octave from each said end of said defined bandwidth.

3. The method of claim 2 further comprising the step of smoothing the abruptness of frequency change at said frequency transitions regions to reduce the energy of frequency components outside of said defined bandwidth by comparison to the energy of those components for an abrupt frequency change.

4. The method of claim 2 or 3 wherein said chirp signals are the product of a process comprising the steps of truncating the frequency spectrums resulting from a series of non-phase-reversed chirp signals and a series of repeatedly phase-reversed chirp signals, transforming the truncated spectrums into the time domain, averaging the resulting frequency-truncated chirp signals, and repeating the truncating, transforming, and averaging steps.

5. The method of claim 4 wherein the result of said steps is a signal with the form defined by the values in Table 1.

6. The method of claim 4 further comprising the step of transmitting said series of chirp signals over AC power lines.

7. The method of claim 6 wherein said defined bandwidth spans from 100 KHz to 400 KHz.

8. The method of claim 7 wherein said chirp signals have the form defined by the values in Table 2.

9. The method of claim 6 wherein said defined bandwidth spans from 20 KHz to 80 KHz.

10. The method of claim 9 wherein said chirp signals have a form as defined by the values in Table 2 adjusted for a 20 KHz to 80 KHz bandwidth.

11. The method of claim 6 wherein two series of said chirp signals are transmitted simultaneously on an AC power line, one series of chirp signals having a said defined bandwidth spanning from 20 KHz to 80 KHz and the other series of chirp signals having a said defined bandwidth spanning from 100 KHz to 400 KHz.

12. The method of claim 4 wherein said truncating, transforming, and averaging steps are repeated until the power level of components with a frequency 10 percent outside of the lower end of the defined badnwidth are more than 20 dB below the average power level within said defined bandwidth.

13. The method of claim 4 wherein said truncating, transforming, and averaging steps are repeated until the power level of components with a frequency 10 percent outside of the higher end of the defined badnwidth are more than 30 dB below the average power level within said defined bandwidth.

14. The method of claim 1, 2, or 3 further comprising the step of transmitting said series of chirp signals over AC power lines.

15. The method of claim 14 wherein said defined bandwidth spans from 100 KHz to 400 KHz.

16. The method of claim 15 wherein said chirp signals have the form defined by the values in Table 2.

17. The method of claim 14 wherein said defined bandwidth spans from 20 KHz to 80 KHz.

18. The method of claim 17 wherein said chirp signals have a form as defined by the values in Table 2 adjusted for a 20 KHz to 80 KHz bandwidth.

19. A method of chirp spread-spectrum communication comprising the steps of
generating a series of spread-spectrum chirp signals;
modulating said chirp signals by reversing their phase, so that there are phase-reversed and non-phase-reversed chirp signals;
concatenating the modulated chirp signals to form a transmitted signal;
each chirp signals comprising at least one frequency-swept portion in which frequency is progressively swept from a first frequency to a second frequency within a defined bandwidth,
the concatenated series of chirp signals having frequency transition regions wherein the frequency sweep terminates and frequency shifts from said second frequency back to said first frequency; and
smoothing the abruptness of frequency change at said frequency transition regions to reduce the energy of frequency components outside of said defined bandwidth by comparison to the energy of those components for an abrupt frequency change.

20. The method of claim 19 wherein each said chirp signal has two said frequency-swept portions,
a first portion in which said first frequency is an intermediate frequency within said defined bandwidth and said second frequency is the frequency at one end of said defined bandwidth, and
a second portion in which said first frequency is the frequency at the other end of said defined bandwidth and said second frequency is said intermediate frequency, and
wherein said frequency transition regions are located within said chirp signals.

21. The method of claim 20 wherein said chirp signals are the product of a process comprising the steps of truncating the frequency spectrums resulting from a series of non-phase-reversed chirp signals and a series of repeatedly phase-reversed chirp signals, transforming the truncated spectrums into the time domain, averaging the resulting frequency-truncated chirp signals, and repeating the truncating, transforming, and averaging steps.

22. The method of claim 21 wherein the result of said steps is a signal with the form defined by the values of Table 1.

23. The method of claim 21 wherein said smoothing reduces the energy of components outside of the defined bandwidth so that the power level of components 10 percent outside of the lower end of the defined bandwidth are more than 25 dB below the average power level within said defined bandwidth.

24. The method of claim 20 wherein said smoothing reduces the energy of components outside of the defined bandwidth so that the power level of components 10 percent outside of the lower end of the defined bandwidth are more than 20 dB below the average power level within said defined bandwidth.

25. The method of claim 20 wherein the power level of components 10 percent outside of the higher end of the defined bandwidth are more than 30 dB below the average power level within said bandwidth.

26. The method of claim 20 further comprising the step of transmitting said series of chirp signals over AC power lines.

27. The method of claim 26 wherein said defined bandwidth spans from 100 KHz to 400 KHz.

28. The method of claim 26 wherein said defined bandwidth spans from 20 Khz to 80 Khz.

29. The method of claim 26 wherein two series of said chirp signals are transmitted simultaneously on an AC power line, one series of chirp signals having a said defined bandwidth spanning from 20 KHz to 80 KHz and the other series of chirp signals having a said defined bandwidth spanning from 100 KHz to 400 KHz.

30. The method of claim 19 wherein each said chirp signal has a single said frequency-swept portion in which said first frequency is the frequency at one end of said defined bandwidth and said second frequency is the frequency at the other end of said defined bandwidth, and wherein said frequency transition regions occur at the boundaries between said chirp signals.

31. The method of claim 30 or 20 wherein said smoothing comprises sweeping the frequency from said second frequency to said first frequency within a few oscillation periods.

32. A method of chirp spread-spectrum communication comprising the steps of
generating a series of swept-frequency chirp signals, in which frequency is generally swept within a defined bandwidth;
modulating said chirp signals by reversing their phase, so that there are phase-reversed and non-phase-reversed chirp signals;
concatenating the modulated chirp signals to form a transmitted signal;
the shape of said chirp signals being altered from that of a progressively swept waveform to reduce the energy of frequency components outside of said defined bandwidth, the resulting waveform being the product of a process comprising the steps of truncating the frequency spectrums resulting from a series of non-phase-reversed chirp signals and a series of repeatedly phase-reversed chirp signals, transforming the truncated spectrums into the time domain, averaging the resulting frequency-truncated chirp signals, and repeating the truncating, transforming, and averaging steps.

33. The method of claim 32 wherein the result of said steps is a signal having the form defined by the values in Table 1.

34. The method of claim 32 or 33 further comprising the step of transmitting said series of chirp signals over AC power lines.

35. The method of claim 34 wherein said defined bandwidth spans from 100 KHz to 400 KHz.

36. The method of claim 34 wherein said defined bandwidth spans from 20 KHz to 80 KHz.

37. The method of claim 34 wherein two series of said chirp signals are transmitted simultaneously on an AC power line, one series of chirp signals having a said defined bandwidth spanning from 20 KHz to 80 KHz and the other series of chirp signals having a said defined bandwidth spanning from 100 KHz to 400 KHz.

38. A transmitter for use in chirp spread-spectrum communication, said transmitter comprising
means for generating a series of swept-frequency chirp signals, in which frequency is swept within a defined bandwidth;
means for modulating said chirp signals by reversing their phase, so that there are phase-reversed and non-phase-reversed chirp signals;
means for concatenating the modulated chirp signals to form a transmitted signal;
each chirp signal comprising two frequency-swept portions,
a first portion in which frequency is progressively swept from an intermediate frequency within said defined bandwidth to a frequency at one end of said defined bandwidth, and
a second portion following said first portion and in which frequency is progressively swept from a frequency at the other end of said defined bandwidth to said intermediate frequency,
wherein within each chirp signal there is a transition in frequency from the frequency at one end of said defined bandwidth to the frequency at the other end of said defined bandwidth.

39. The transmitter of claim 38 wherein said defined bandwidth spans at least about two frequency octaves and wherein said intermediate frequency is at least about one octave from each said end of said defined bandwidth.

40. The transmitter of claim 39 further comprising means for smoothing the abruptness of frequency change at said frequency transitions regions to reduce the energy of frequency components outside of said defined bandwidth by comparison to the energy of those components for an abrupt frequency change.

41. The transmitter of claim 38, 39, or 40 further comprising means for transmitting said series of chirp signals over AC power lines.

42. The transmitter of claim 41 wherein said defined bandwidth spans from 100 KHz to 400 KHz.

43. The transmitter of claim 42 wherein said chirp signals have the form defined by the values in Table 2.

44. The transmitter of claim 41 wherein said defined bandwidth spans from 20 KHz to 80 KHz.

45. The transmitter of claim 44 wherein said chirp signals have a form as defined by the values in Table 2.

46. The transmitter of claim 41 further comprising means for transmitting two series of said chirp signals simultaneoulsy on an AC power line, one series of chirp signals having a said defined bandwidth spanning from 20 KHz to 80 KHz and the other series of chirp signals having a said defined bandwidth spanning from 100 KHz to 400 KHz.

* * * * *

UNITED STATES PATENT AND TRADEMARK OFFICE
CERTIFICATE OF CORRECTION

PATENT NO.   : 5,263,046

DATED        : November 16, 1993

INVENTOR(S)  : James E. Vander Mey

It is certified that error appears in the above-identified patent and that said Letters Patent is hereby corrected as shown below:

Column 2, line 37, "doublings" should be --doubling--.

Column 6, line 47, "phase-transition reversed" should be --phase-reversed--.

TABLE 1, column 4, first row, "-0.6363" should be --0.6563--.

Column 12, line 62, "of claim 4" should be "of claim 1, 2, or 3".

Column 13, line 24, "of claim 1, 2, or 3" should be --of claim 4--.

Signed and Sealed this

Twenty-eighth Day of June, 1994

Attest:

BRUCE LEHMAN

*Attesting Officer*     Commissioner of Patents and Trademarks